Patented June 2, 1953

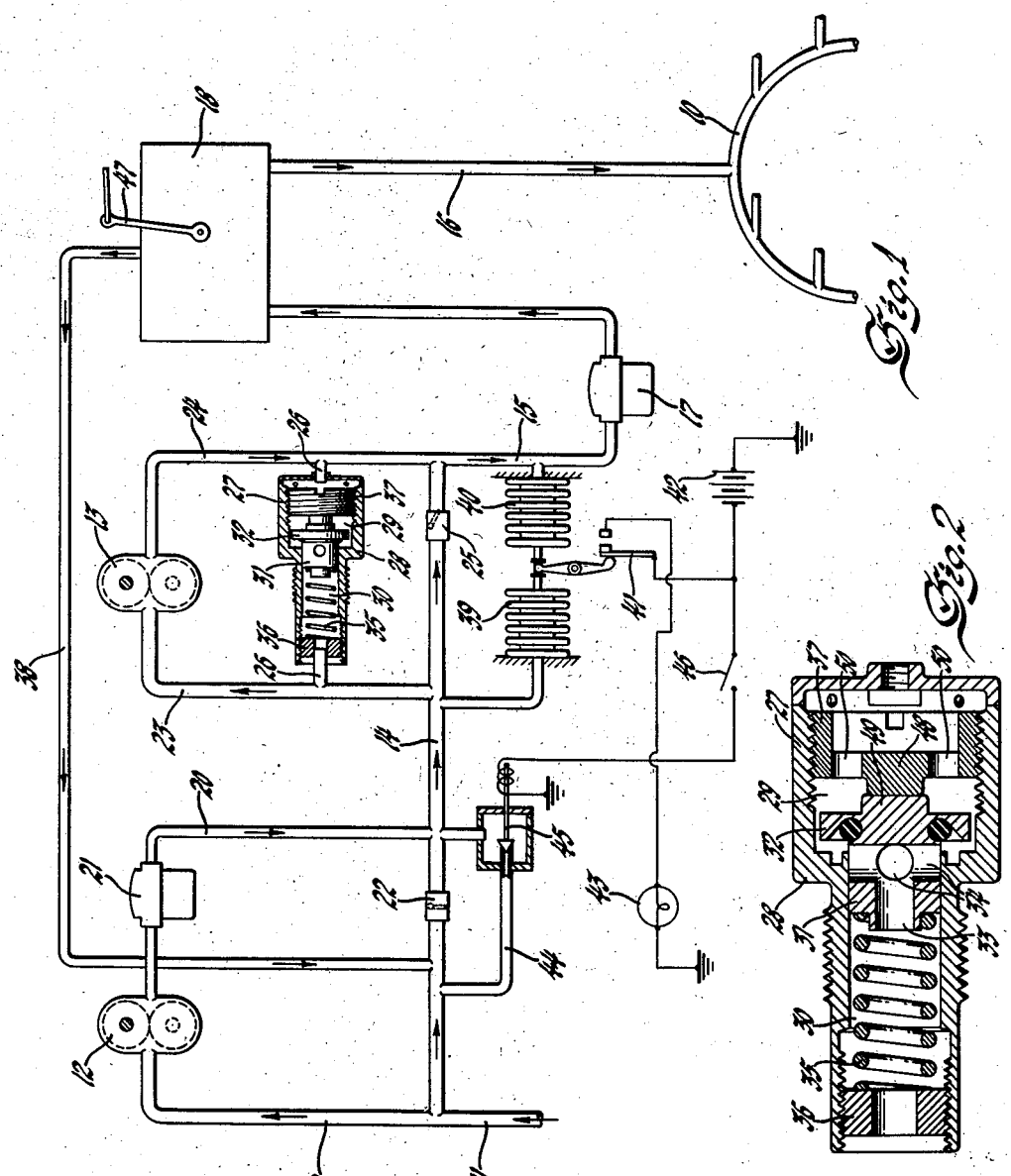

2,640,423

UNITED STATES PATENT OFFICE 2,640,423

FUEL SYSTEM

Floyd J. Boyer, Indianapolis, Ind., assignor to General Motors Corporation, Detroit, Mich., a corporation of Delaware Application January 18, 1950, Serial No. 139,216

13 Claims. (Cl. 103—11)

This invention has to do with fuel systems, particularly fuel systems for combustion gas turbines which are used to propel airplanes. More specifically, the invention has to do with fuel systems which include two pumps of the same nominal capacity which are arranged in series and each of which is capable of supplying by itself at the desired pressure all of the fuel it is desired to supply to the user.

The principal object of the invention is to provide a fuel system of the type referred to in which, whether its actual capacity is higher or lower than that of the other pump, a preselected one of the pumps will supply all of the fuel to the user and the other pump will operate idly as long as the actual capacity of the former exceeds a preselected value and upon decrease of the actual capacity of the former to a value below the preselected value the latter will supply all of the fuel to the user. Decrease in the actual capacity of a pump to a value below the preselected value is hereinafter referred to as "total failure" of the pump.

Another object of the invention is to provide in a fuel system of the type referred to means for indicating whether the individual fuel pumps are operating below or above a preselected efficiency regardless of which of the pumps is operating at the higher efficiency.

For a better understanding of the objects and nature of this invention, reference is made to the following specification and the accompanying drawing wherein the preferred embodiment of the invention is described and illustrated.

In the accompanying drawing:

Figure 1 illustrates more or less diagrammatically a fuel system for an airplane propelling combustion gas turbine in which the invention is embodied.

Figure 2 is an enlarged longitudinal section through a valve included in the system shown in Figure 1.

In the drawing, the reference character 10 indicates the manifold through which fuel is supplied to the several burners of an airplane propelling combustion gas turbine and the reference character 11 a pipe in which fuel from a supply tank (which is not shown in the drawing) is maintained by a pump (which is not shown in the drawing). To supply fuel to the manifold 10 from the pipe 11, there are provided primary and secondary pumps 12 and 13 which are of the same nominal capacity and are driven at the same speed by the turbine and of which each is capable by itself of supplying at the desired pressure all of the fuel it is desired to supply to the turbine.

The pipe 11 is connected to the manifold 10 by pipes 14, 15 and 16. Between sections of the pipe 15 there is interposed a filter 17 and between the pipes 15 and 16 there is interposed a control 18 with an operating lever 47 for regulating the rate at which fuel is supplied to the manifold 10.

The inlet of the primary pump 12 is connected by a pipe 19 to the pipes 11 and 14 at their junction and the outlet thereof is connected by a pipe 20 to the pipe 14 on the downstream side of its junction with the pipe 11. Between sections of the pipe 20 there is interposed a fuel filter 21. In the pipe 14 between the junctions of the pipe 19 and 20 therewith, there is disposed a check valve 22 which is closed when the pressure on the outlet side of the primary pump 12 exceeds the pressure on the inlet side thereof.

The inlet of the secondary pump 13 is connected by a pipe 23 to the pipe 14 on the downstream side of its junction with the pipe 20 and the outlet thereof is connected by a pipe 24 to the pipes 14 and 15 at their junction. In the pipe 14 between the junctions of the pipes 23 and 24 therewith, there is disposed a check valve 25 which is closed when the pressure on the outlet side of the secondary pump 13 exceeds the pressure on the inlet side thereof. The sections of the conduit 14 in which the check valves 22 and 25 are located constitute bypass conduits around the primary and secondary pumps 12 and 13 respectively.

The pipes 23 and 24 are interconnected by a second bypass pipe 26 between sections of which there is interposed a bleed valve 27. The bleed valve includes a body 28 with an enlarged portion at one end within which there is a chamber 29 and a reduced portion at its opposite end through which extends a bore 30 which opens into the chamber 29. The chamber 29 is connected to the section of the pipe 26 which is connected to the pipe 24 and the bore 30 to the section of the pipe 26 which is connected to the pipe 23. In the bore 30 there is disposed a piston valve 31 with an enlarged head 32 disposed in the chamber 29. Into the valve 31 to a point adjacent the enlarged head 32, there extends lengthwise of the valve a bore 33 and through the body of the valve adjacent the enlarged head 32, there extend transversely of the piston bores 34 which intersect the bore 33. In the bore 30 of the body 28, there is disposed a coil spring 35 which bears against the end of the valve 31 and an annular member 36 which is threaded into the bore and tends to maintain the valve in a position in which the transverse bores 34 open into the chamber 29. In the chamber 29 there is disposed a plug-like member 37 which is threaded into the wall of the chamber and has on it a boss 48 against which abuts a boss 49 on the enlarged head 32 of the valve 31 to limit the extent to which the valve may be opened. Through the member 37 there extend restricted bores 50 through which fuel may pass from the portion of the chamber 29 on the outer into the portion of the chamber on the inner side of the member. The extent to which the valve 31 may be opened may be varied by adjustment of the member 37 and the effective resistance of the spring 35 to closing the valve may be varied by adjustment of the member 36.

To the inlet and outlet of the secondary pump 13, there are connected pressure responsive members 39 and 40 which are connected to a switch 41 so that the switch closes a circuit from a source of electrical energy 42 to a light 43 when the pressure on the outlet side of the secondary pump exceeds that on the inlet side thereof by a preselected value.

The control 18 is of the type in which the fuel supplied to it in excess of that it is desired to supply to the manifold 10 is returned to the inlets of the fuel pumps. To return this fuel to the inlets of the fuel pumps there is provided a pipe 38 which is connected to the control and to the pipe 14 between its junction with the pipe 11 and the check valve 22.

When the turbine is operating, the primary pump 12 withdraws fuel from the pipe 11 through the pipe 19 and discharges it into the pipe 14 through the pipe 20 and the filter 21. If both of the pumps 12 and 13 are operating at the same efficiency or the primary pump 12 is operating at higher efficiency than the secondary pump 13, whether inherently or by reason of partial or total failure of the secondary pump, pressure of the fuel on the outlet side of the primary pump will keep the check valve 22 closed. Under these conditions fuel will be supplied by the primary pump to the manifold 10 through the pipe 20, the section of the pipe 14 between the junctions of the pipes 20 and 23 therewith, the pipe 23, the secondary pump 13, the pipes 24 and 15, the filter 17, the control 18 and the pipe 16. The excess, if any, of fuel supplied by the primary pump over that forwarded by the secondary pump passes directly into the pipe 15 through the section of the pipe 14 between the junctions of the pipes 23 and 24 therewith. Under the conditions under consideration the secondary pump, of course, operates idly.

If the secondary pump 13 is operating at higher efficiency than the primary pump 12, whether inherently or by reason of failure, short of substantially total failure, of the primary pump, the primary pump will continue to operate as described above. The members 36 and 37 of the valve 27 are, however, so adjusted that until the primary pump has failed substantially totally the valve 27 remains open and fuel is by-passed through the pipe 26 and the valve 27 from the outlet to the inlet side of the secondary pump at a rate substantially equal to the difference between the capacities of the secondary and primary pumps so that the secondary pump continues to operate idly. The valve 27 thus serves when the secondary pump is operating at higher efficiency than the primary pump to maintain the differential between the pressures on the outlet and inlet sides of the secondary pump below the preselected value at which the switch 41 is closed and idle operation of the secondary pump until the primary pump has failed substantially totally. Upon substantially total failure of the primary pump, the differential between the pressures on the outlet and inlet sides of the secondary pump increases to a value above the preselected value at which the switch 41 is closed. Consequently, an unlighted condition of the light 43 indicates that the primary pump has not failed substantially totally and a lighted condition of the light indicates that the primary pump has failed substantially totally.

The increase in the differential between the pressures on the outlet and inlet sides of the secondary pump which occurs when the primary pump 12 fails substantially totally causes the valve 27 to close and the secondary pump 13, consequently to take the full load of supplying fuel to the control 18 at the desired rate and pressure. Under this condition, the check valve 22 is open and the check valve 25 is closed, as it is whenever the secondary pump is operating at a higher efficiency than the primary pump, and fuel is supplied from the pipe 11 directly to the inlet of the secondary pump through the pipes 14 and 23. Under this condition some fuel may also be supplied to the inlet of the secondary pump by the primary pump unless the primary pump has absolutely totally failed. The restriction of the bores 50 in the member 37 results in increase of the fuel pressure on the valve 31 in the direction to close the valve as the valve is closed and, consequently, upon substantially total failure of the primary pump, the valve 31 immediately closes completely and remains completely closed.

To afford a check on the operation of the secondary pump, there is provided means by which, in effect, the primary pump may be put out of operation. This means includes a by-pass in the form of a pipe 44 from the outlet to the inlet side of the primary pump and between sections of the pipe a solenoid operated valve 45 which normally closes the pipe but may be opened by closing a switch 46 in a circuit from the source of electrical energy 42 to the solenoid. When the valve 45 is open a lighted condition of the light 43 indicates that the secondary pump has not failed and an unlighted condition of the light 43 indicates that the secondary pump has failed substantially totally.

To afford an indication of the sense in which the term "substantially total failure" is used in this specification, it may be well to add that, assuming that the primary and secondary pumps are individually nominally capable of supplying fuel at twice the maximum rate it is desired to supply fuel to the user, a reduction of the capacity of a pump to, say, 75% of its nominal capacity may be considered a substantially total failure of the pump.

I claim:

1. In a system for advancing fuel from a reservoir to a user, a line through which fuel may be conducted from the reservoir to the user, two pumps in series in the line for advancing fuel through the line from the reservoir to the user, a line through which fuel may be conducted around each of the pumps from its inlet to its outlet, a valve in each of the last specified lines which inhibits flow of fuel therethrough from the outlet to the inlet of the pump around which the line may conduct fuel, means for indicating when the pressure on the downstream side exceeds the pressure on the upstream side of the downstreammost pump by a preselected value, a line through which fuel may be conducted around the downstreammost pump from its outlet to its inlet, a valve in the last specified line which permits flow of fuel therethrough from the outlet to the inlet of the downstreammost pump at a rate which varies with the difference between the capacities of the downstreammost and upstreammost pumps until the difference exceeds a preselected value so that the indicating means indicates the operativeness of the upstreammost pump, a line through which fuel may be conducted around the upstreammost pump from its outlet to its inlet, and a valve in the line which may be opened to permit fuel to flow from the outlet to the inlet of the upstreammost pump so that the indicating means will indicate the operativeness of the downstreammost pump.

2. In a system for advancing fuel from a reservoir to a user, a line through which fuel may be conducted from the reservoir to the user, two pumps in series in the line for advancing fuel through the line from the reservoir to the user, a line through which fuel may be conducted around each of the pumps from its inlet to its outlet, a valve in each of the last specified lines which inhibits flow of fuel therethrough from the outlet to the inlet of the pump around which the line may conduct fuel, means for indicating when the pressure on the downstream side exceeds the pressure on the upstream side of one of the pumps by a preselected value, a valve which permits flow of fuel from the outlet to the inlet of the last mentioned pump at a rate which differs with the difference between the capacities of the pumps until the difference exceeds a preselected value so that the indicating means indicates the operativeness of the other pump, and a valve which may be opened to permit fuel to flow from the outlet to the inlet of the last mentioned pump so that the indicating means will indicate the operativeness of the other pump.

3. In a fluid system, a line through which fluid pressure may be transmitted from one point to another, two pumps in series for applying pressure to fluid in the line, a line through which fluid pressure may be transmitted around each of the pumps from its inlet to its outlet, a valve in each of the last specified lines which inhibits transmission of fluid pressure therethrough from the outlet to the inlet of the pump around which the line may transmit fluid pressure, means for indicating when the pressure on the downstream side exceeds the pressure on the upstream side of one of the pumps by a preselected value, a valve which permits transmission of fluid pressure from the outlet to the inlet of the last mentioned pump until the difference between the capacities of the pumps exceeds a preselected value so that the indicating means indicates the operativeness of the other pump, and means for rendering the last mentioned pump effectively ineffective so that the indicating means will indicate the operativeness of the other pump.

4. In a fluid system, a line through which fluid pressure may be transmitted from one point to another, two pumps in series for applying pressure to fluid in the line, a line through which fluid pressure may be transmitted around each of the pumps from its inlet to its outlet, a valve in each of the last specified lines which inhibits transmission of fluid pressure therethrough from the outlet to the inlet of the pump around which the line may transmit fluid pressure, means for indicating when the pressure on the downstream side exceeds the pressure on the upstream side of one of the pumps by a preselected value and a valve which permits transmission of fluid pressure from the outlet to the inlet of the last mentioned pump until the difference between the capacities of the pumps exceeds a preselected value so that the indicating means indicates the operativeness of the other pump.

5. In a system for advancing fuel from a reservoir to a user, a line through which fuel may be conducted from the reservoir to the user, two pumps in series in the line for advancing fuel through the line from the reservoir to the user, a line through which fuel may be conducted around each of the pumps from its inlet to its outlet, a valve in each of the last specified lines which inhibits flow of fuel therethrough from the outlet to the inlet of the pump around which the line may conduct fuel, a line through which fuel may be conducted around the downstreammost pump from its outlet to its inlet, a normally open valve in the last specified line which permits flow of fuel therethrough from the outlet to the inlet of the downstreammost pump, a line through which fuel may be conducted around the upstreammost pump from its outlet to its inlet, and a stop valve in the last specified line which may be opened to permit fuel to flow from the outlet to the inlet of the upstreammost pump.

6. In a system for advancing fuel from a reservoir to a user, a line through which fuel may be conducted from the reservoir to the user, two pumps in series in the line for advancing fuel through the line from the reservoir to the user, a line through which fuel may be conducted around each of the pumps from its inlet to its outlet, a valve in each of the last specified lines which inhibits flow of fuel therethrough from the outlet to the inlet of the pump around which the line may conduct fuel, a conduit including a normally open valve which permits flow of fuel from the outlet to the inlet of one of the pumps at a rate which differs with the difference between the capacities of the pumps, and means for closing the normally open valve when the difference exceeds a preselected value.

7. In a fluid system, a line through which fluid pressure may be transmitted from one point to another, two pumps in series for applying pressure to fluid in the line, a line through which fluid pressure may be transmitted around each of the pumps from its inlet to its outlet, a valve in each of the last specified lines which inhibits transmission of fluid pressure therethrough from the outlet to the inlet of the pump around which the line may transmit fluid pressure, and a valve which permits transmission of fluid pressure from the outlet to the inlet of one of the pumps, the last-mentioned valve being biased to open position and being closed by flow therethrough in excess of a predetermined rate.

8. A fluid pumping system comprising a primary pump and a secondary pump connected in series, a bypass conduit around each pump, a check valve in each bypass conduit to prevent flow from the outlet to the inlet of the corresponding pump, a second bypass conduit around the secondary pump, and a normally open valve in the second bypass conduit so constructed as to close the second by pass conduit in response to flow through the second bypass conduit from the outlet to the inlet of the secondary pump in excess of a predetermined rate.

9. A fluid pumping system comprising a primary pump and a secondary pump connected in series, the pumps being of the positive-displacement type and of substantially equal capacity, a bypass conduit around each pump, a check valve in each bypass conduit to prevent flow from the outlet to the inlet of the corresponding pump, a second bypass conduit around the secondary pump, a normally open valve in the second bypass conduit, and means responsive to a predetermined rate of flow through the second bypass between the outlet and the inlet of the secondary pump to close the normally open valve.

10. A fluid pumping system comprising a primary pump and a secondary pump connected in series, a bypass conduit around each pump, a check valve in each bypass conduit to prevent flow from the outlet to the inlet of the corresponding pump, a second bypass conduit around the secondary pump, a normally open valve in the second bypass conduit, and means responsive to a pressure differential between the outlet and the inlet of the secondary pump to close the normally open valve.

11. A fluid pumping system comprising a primary pump and a secondary pump connected in series, the pumps being of the positive-displacement type and of substantially equal capacity, a bypass conduit around each pump, a check valve in each bypass conduit to prevent flow from the outlet to the inlet of the corresponding pump, a second bypass conduit around the secondary pump, a normally open valve in the second bypass conduit, and means responsive to a pressure differential between the outlet and the inlet of the secondary pump to close the normally open valve.

12. A fluid pumping system comprising a primary pump and a secondary pump connected in series, the pumps being of the positive-displacement type and of substantially equal capacity, a bypass conduit around each pump, a check valve in each bypass conduit to prevent flow from the outlet to the inlet of the corresponding pump, a second bypass conduit around the secondary pump, a normally open valve in the second bypass conduit, means responsive to a pressure differential between the outlet and the inlet of the secondary pump to close the normally open valve, a third by pass conduit around the primary pump, and a normally closed stop valve in the third bypass conduit.

13. In combination, two pumps driven in synchronism, the pumps being normally connected in series, means responsive to normal operation of one pump to unload the other pump, means responsive to diminished output volume of the said one pump to activate the said other pump and bypass the said one pump, and means for diverting at least part of the output of the said one pump to check the operation of the said activating means and the said other pump.

FLOYD J. BOYER.

References Cited in the file of this patent

UNITED STATES PATENTS

| Number | Name | Date |
|---|---|---|
| 615,760 | Smith | Dec. 13, 1898 |
| 1,049,894 | Merrill | Jan. 7, 1913 |
| 1,477,850 | Pool | Dec. 18, 1923 |
| 1,814,857 | Rosle | July 14, 1931 |
| 1,825,661 | Gull | Oct. 6, 1931 |
| 2,218,565 | Vickers | Oct. 22, 1940 |
| 2,366,388 | Crosby | Jan. 2, 1945 |